(12) United States Patent
Suzuki et al.

(10) Patent No.: US 7,200,169 B2
(45) Date of Patent: Apr. 3, 2007

(54) DSL MODEM APPARATUS AND INITIALIZATION METHOD FOR DSL COMMUNICATION

(75) Inventors: Takashi Suzuki, Yokosuka (JP); Motoyoshi Nagai, Yokohama (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 751 days.

(21) Appl. No.: 10/404,072

(22) Filed: Apr. 2, 2003

(65) Prior Publication Data
US 2003/0223484 A1 Dec. 4, 2003

(30) Foreign Application Priority Data
May 31, 2002 (JP) ............................. 2002-160496

(51) Int. Cl.
*H04B 1/38* (2006.01)
*H04L 5/16* (2006.01)
(52) U.S. Cl. ...................... 375/222; 375/146; 375/147; 375/219; 375/295; 375/316
(58) Field of Classification Search ................ 375/222, 375/146, 147, 219, 295, 316
See application file for complete search history.

(56) References Cited
U.S. PATENT DOCUMENTS
5,751,741 A * 5/1998 Voith et al. ................. 714/758

| | | | | |
|---|---|---|---|---|
| 6,771,697 B1 * | 8/2004 | Goldstein et al. | ........... | 375/222 |
| 2001/0022810 A1 | 9/2001 | Joo | ............................. | 375/222 |
| 2002/0008256 A1 | 1/2002 | Liu | ............................. | 257/207 |
| 2002/0196874 A1 | 12/2002 | Tomita et al. | | |
| 2003/0223459 A1 | 12/2003 | Tomita et al. | | |
| 2003/0223483 A1 | 12/2003 | Noma et al. | | |

FOREIGN PATENT DOCUMENTS
KR 2000-0034006 6/2000
WO 01/10105 2/2001

OTHER PUBLICATIONS
English Language Abstract of KR 2000-0034006.
* cited by examiner

*Primary Examiner*—Chieh M. Fan
*Assistant Examiner*—Ted M. Wang
(74) *Attorney, Agent, or Firm*—Greenblum & Bernstein, P.L.C.

(57) ABSTRACT

An ADSL modem apparatus including an IFFT unit that performs an inverse fast Fourier transform on transmission data, an FFT unit that performs a fast Fourier transform on reception data, and a processor that performs an initialization sequence according to a protocol, is provided. During the initialization sequence, the processor maintains and enables an interleave memory to be employed. After data transmission is initiated, the processor instructs a switch controller so that an interleave unit and de-interleave unit can use the interleave memory.

1 Claim, 6 Drawing Sheets

DSL MODEM APPARATUS AND INITIALIZATION METHOD FOR DSL COMMUNICATION

BACKGROUND OF THE INVENTION

1. Field of the Invention

The present invention relates to a DSL modem apparatus and an initialization method for DSL communication applicable to a multi-carrier method data transmission apparatus that transmits data using a plurality of carriers with various frequencies.

2. Description of Related Art

The ADSL (Asymmetric Digital Subscriber Line) is a service that employs an existing telephone line so that both a high speed Internet connection service and ordinary telephone service can use the same line, which has rapidly become available in the recent years. For providing such ADSL services, ITU-T recommendations have been issued regarding ADSL modems. G.lite and G.dmt recommendations established in 1999 at ITU-T SG15 are ADSL standard recommendations, which further extend to ANNEX.A, ANNEX.B, ANNEX. C, and etc. for initialization establishing methods according to the communication environment of individual country (or region).

Figure 4:
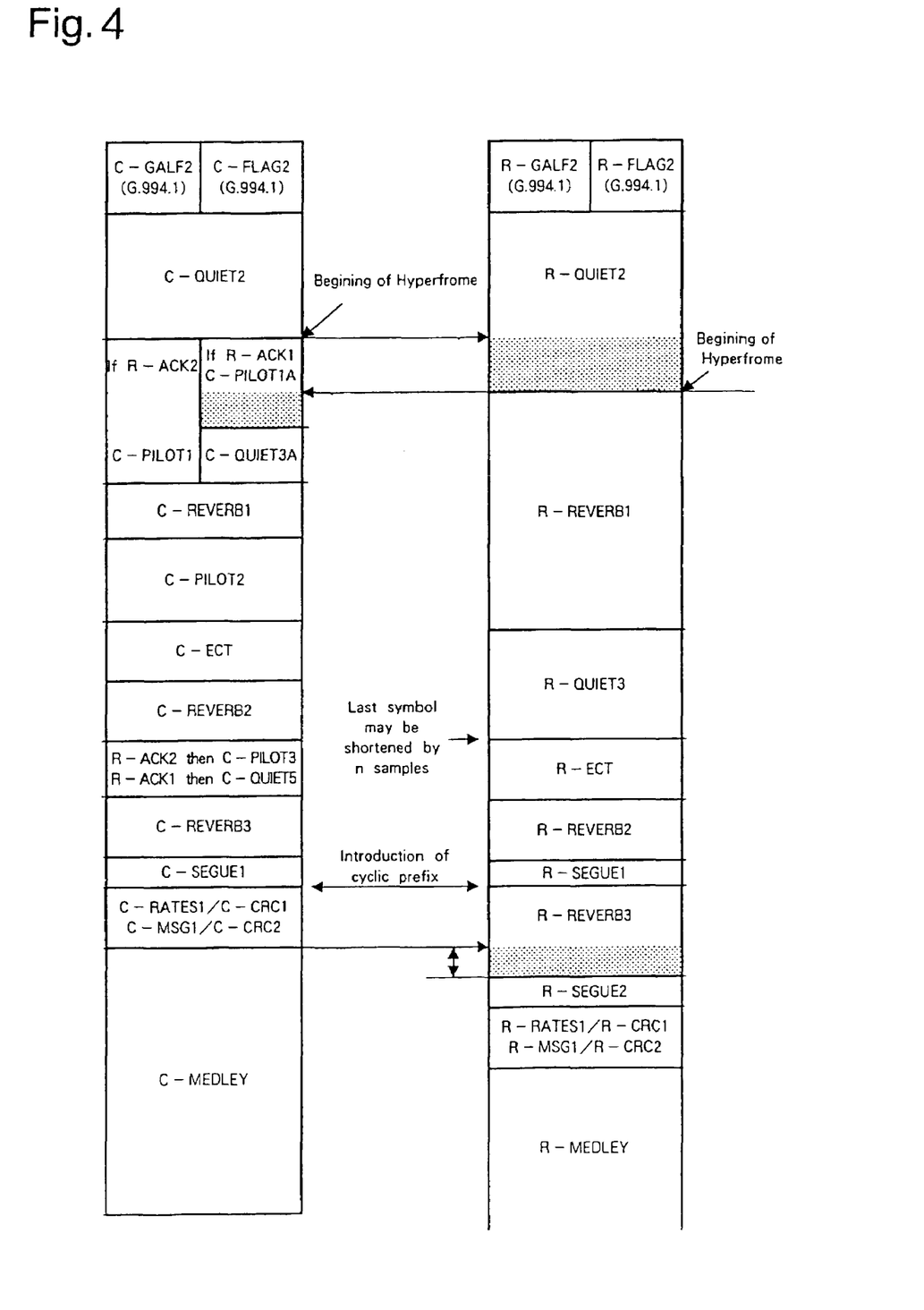
FIG. 4 illustrates a first half of an initialization sequence.
Figure 5:
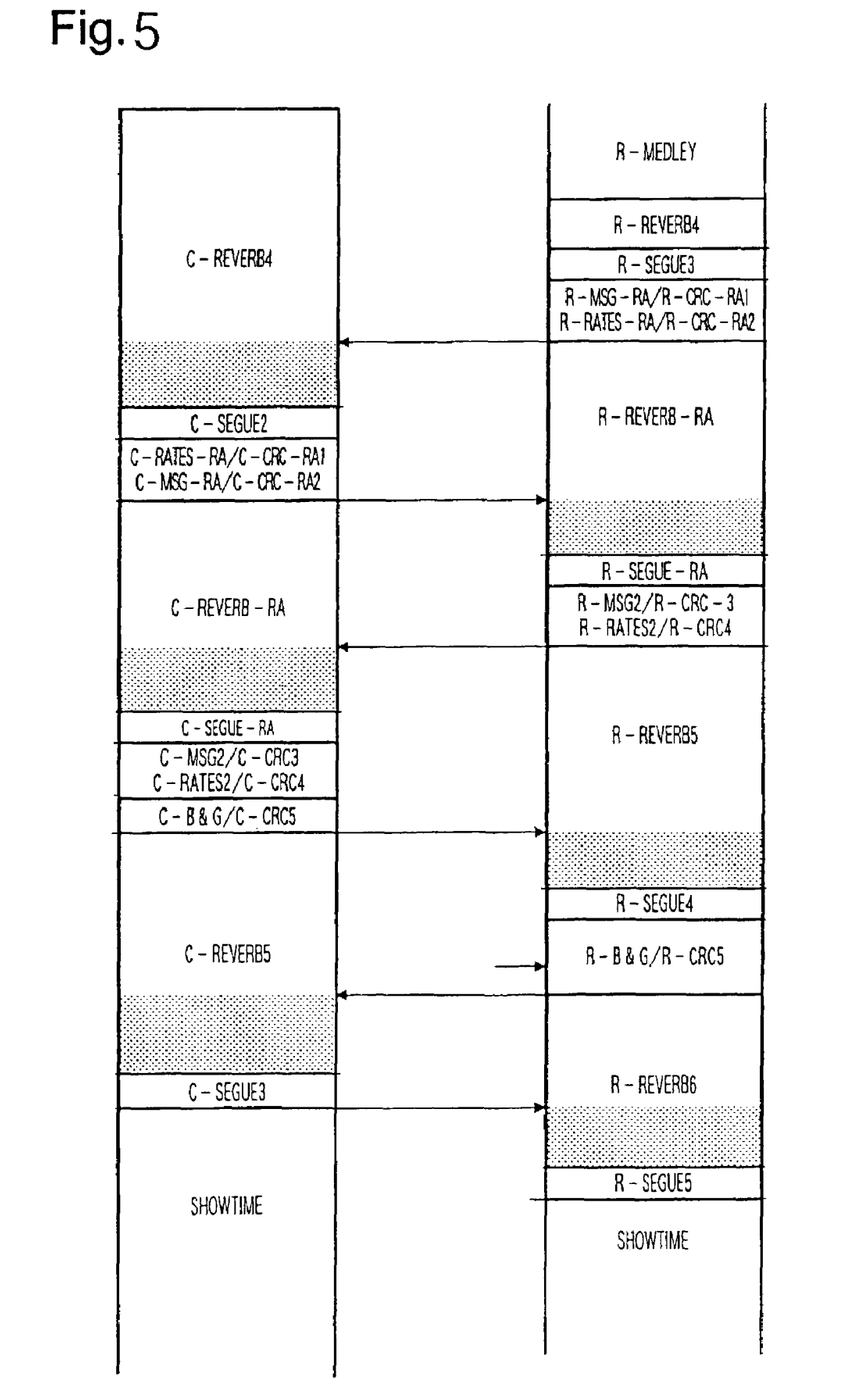
FIG. 5 is a second half of the initialization sequence.

FIGS. 4 and 5 illustrate an initialization sequence according to G.lite or G.dmt. In the figures, the left (C) side illustrates an exchange side apparatus (ATU-C), while the right (R) side illustrates a remote terminal apparatus, e.g., at home (ATU-R).

During the initialization sequence, immediately after C-QUIET2 and R-QUIET2, the ATU-C starts hyperframe transmission from "Beginning of Hyperframe". After the ATU-C starts the hyperframe transmission and upon counting a predetermined number of symbols, the ATU-R matches symbol by finding the beginning of the hyperframe. When the ATU-C transmits C-REVERB1 and C-REVERB2, the ATU-R makes a final adjustment to the symbol synchronization for the reception symbol at location "Last symbol may be shortened by n samples". The symbol synchronization is performed by forcefully shortening the symbol by n samples, which correspond to a deviation of the symbol synchronization.

As described above, the symbol synchronization of the ATU-R employs C-REVERB1, C-REVERB2, or C-REVERB3 signal received from the ATU-C. This is due to the fact that a REVERB signal includes carriers ranging #32–#127, or #32–#255, and the recommendation clearly states what kind of signal is being sent from the ATU-C, which is useful for establishing a synchronization.

Hereafter, the symbol synchronization method at the ATU-R is illustrated. When the IFFT input signal of C-REVERB at the transmission side (data before calculation, although the transmission side performs the inverse fast Fourier transform on a bit stream that configures a symbol) is X(f), and the FFT input signal of the received signal without the symbol synchronization at the reception side (signal before calculation, although the reception side performs the fast Fourier transform) is Y(f), the following calculation at the reception side can be provided:

$$Z(f)=Y(f)/X(f)$$

When impulse response is res (t), the following calculation is provided:

$$\text{res }(t)=\text{invers}FFT\ (Z(f))$$

The above formula calculates the impulse response (res (t)) on the line.

Figure 6:
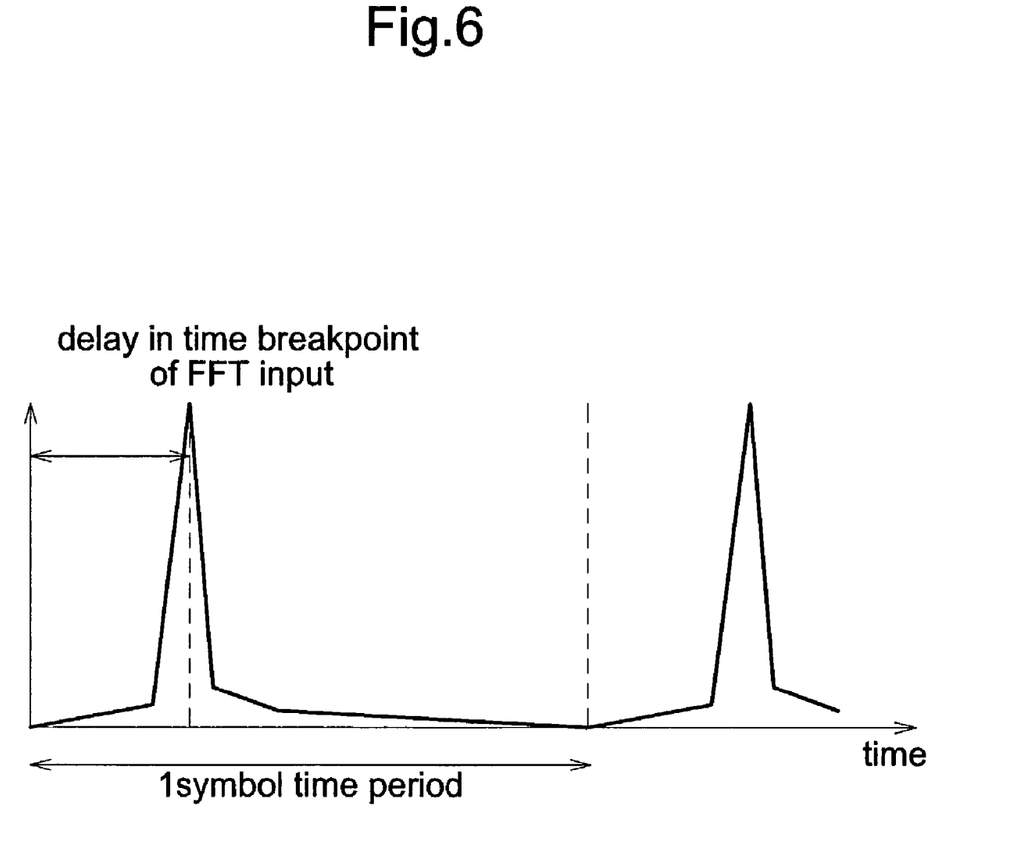
FIG. 6 illustrates a method of establishing symbol synchronization.

FIG. 6 illustrates a waveform of the impulse response calculated at the reception side. The receiver side locates a peak of the impulse response as illustrated in FIG. 6, and detects the beginning of the C-REVERB symbol. The above-described symbol matching method is an example that can be applied to ANNEX. A specification. Other suitable methods can be applied to different specifications.

When the initialization sequence is completed, data transmission (SHOWTIME) is started. ADSL communication employs the interleave method that is resistant to a burst error. The interleave method sorts data up to a predetermined symbol in a predetermined rule for transmission and restores the reception data by resorting at the reception side. Data sorting is performed within a memory having enough capacity for the interleave process (interleave memory). ADSL communication apparatus sorts data by opening transmission data within the interleave memory at the time of transmission, and resorts data into the original order by opening the reception data within the interleave memory for reception.

An improvement of reducing the number of parts within the apparatus can be made, when the reception timing adjustment for symbol matching during the initialization sequence is designed so that the processor can process as software. This is because the circuit for calculating the reception timing adjustment can be eliminated.

However, when the reception timing adjustment is performed by the processor as software, the production cost may rise because a memory having a large enough capacity needs to be installed for the calculation.

SUMMARY OF THE INVENTION

This invention addresses the above-described problem. The purpose of the present invention is to provide a DSL modem apparatus and an initialization method for the DSL communication that enables an interleave memory (used after initiating the data transmission) to be employed for a calculation procedure for the reception timing adjustment during the initialization sequence, has a configuration of software within the processor to adjust the reception timing, and reduces the production cost by eliminating the need for an additional memory.

In order for the processor to perform a reception timing adjustment as software during the initialization sequence, the present invention utilizes a memory that is provided for data transmission purpose but used during the initialization sequence, so that the memory can be used as a work area for calculation by the processor.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

The embodiments of the present invention are explained in the following, in reference to the above-described drawings.

Figure 1:
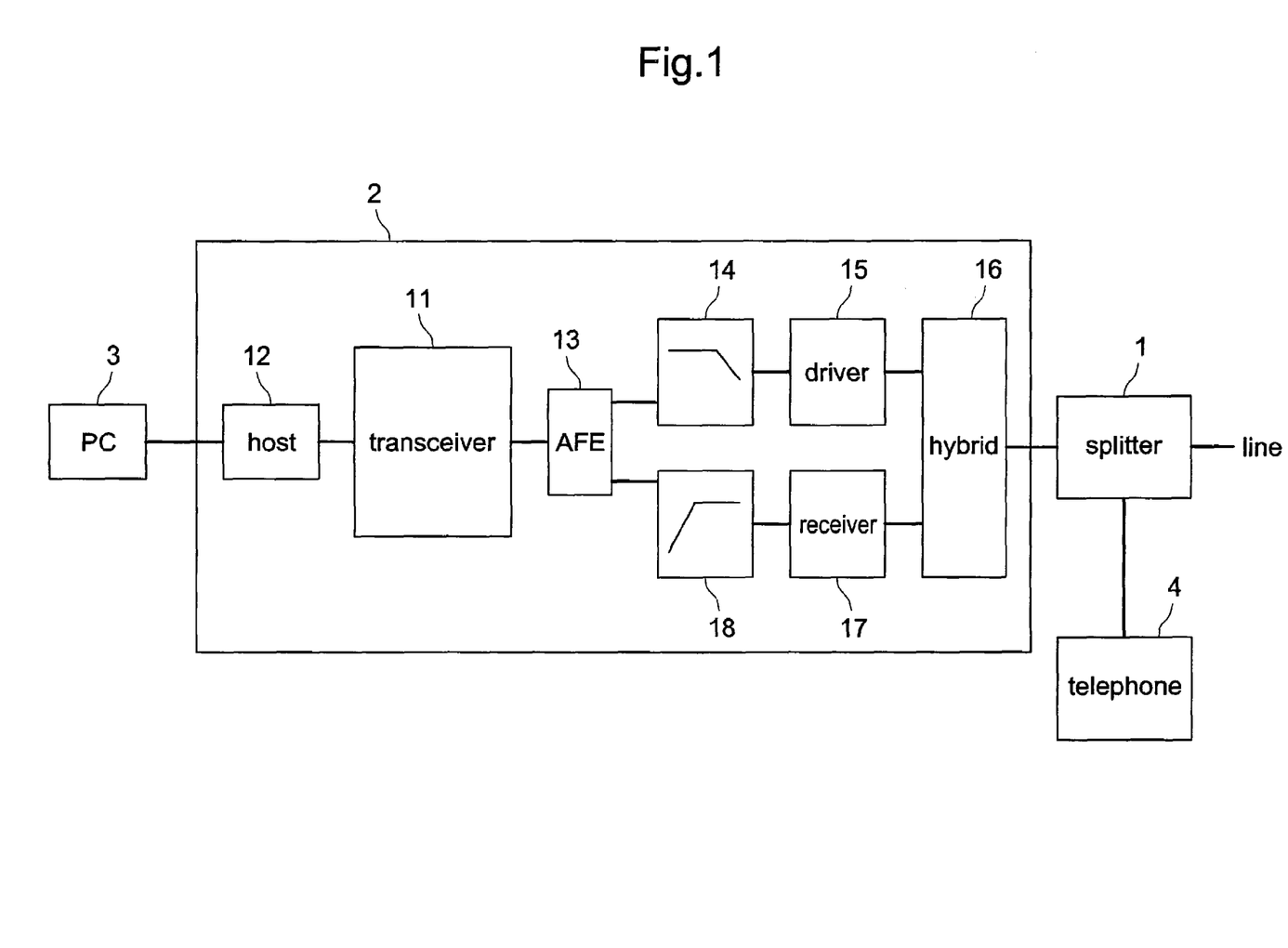
FIG. 1 illustrates a configuration of an ATU-R transmission system according to an embodiment of the present invention.

FIG. 1 illustrates a diagram of a communication system at the ATU-R side according to the present invention. In the communication system as illustrated in FIG. 1, a public phone line or a similar phone line (hereafter referred to as line) is connected to ADSL communication apparatus 2 via splitter 1. Further, user terminal 3 is connected to ADSL communication apparatus 2. When user terminal 3 and telephone 4 share one line, splitter 1 is necessary. However, when telephone 4 is not used, splitter 1 is not needed. It is also possible to have a configuration where user terminal 3 internally installs ADSL communication apparatus 2.

ADSL communication apparatus 2 includes transceiver 11 that executes an initialization sequence (which will be later-described), and host 12 that controls the entire operation including the one of transceiver 11. At the line side of transceiver 11, units are configured with an analog circuit via an analog front end (hereafter referred to as AFE). Driver 15 is connected to a DA converter of AFE 13 via analog filter 14, so that analog signal amplified by driver 15 is transmitted to the line via hybrid 16. The analog signal transmitted from the line is received by receiver 17 via hybrid 16, and then input into an AD converter of AFE 13 via analog filter 18. When sampling data is output from the AD converter, AFE 13 outputs the data to transceiver 11.

Figure 2:
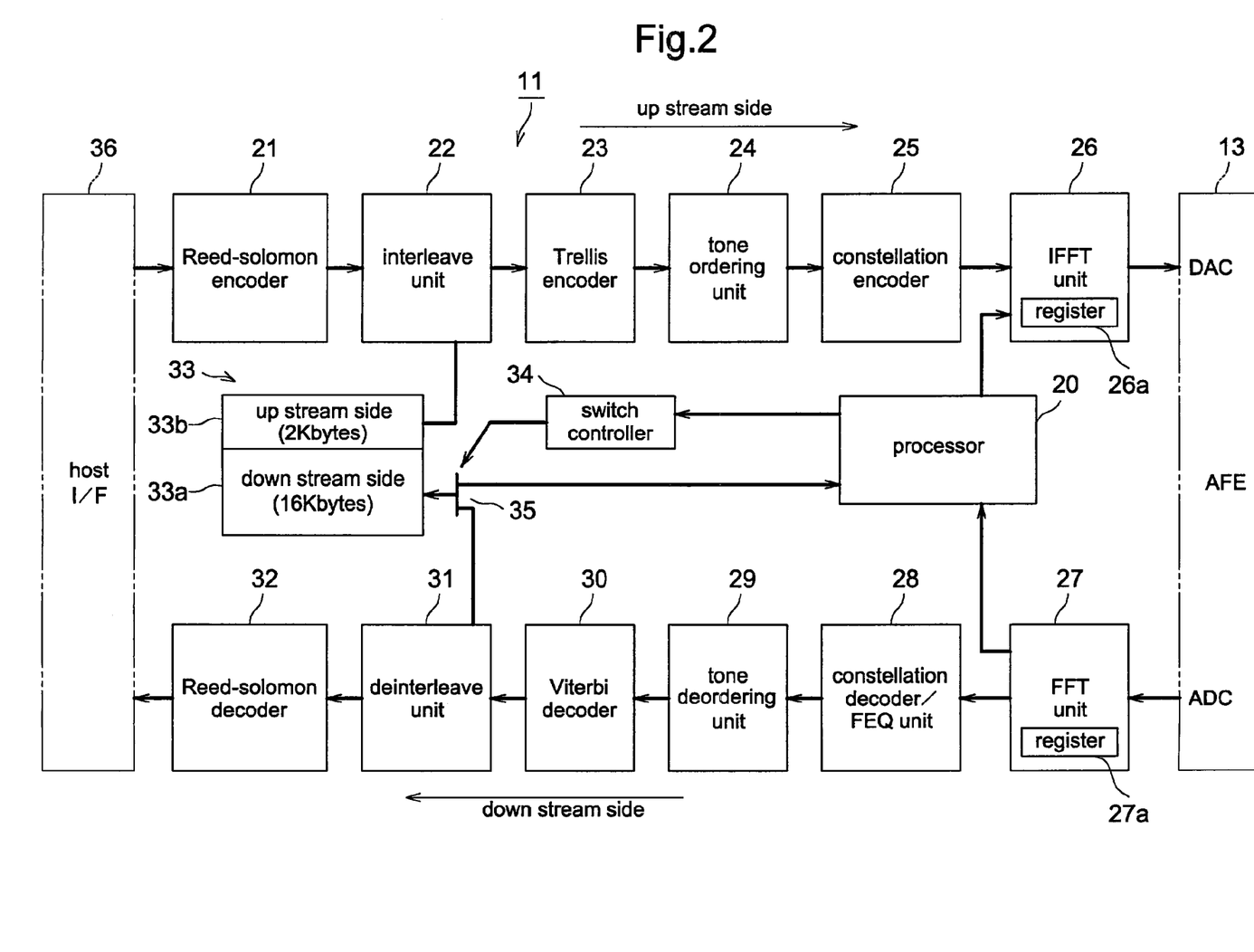
FIG. 2 is a functional block diagram of a transceiver of FIG. 1.

FIG. 2 is a functional block diagram illustrating transceiver 11. Processor 20 has a function to execute the handshake step and initialization step prior to initiating data transmission (SHOWTIME). Processor 20 also has a function to monitor errors after the data transmission.

The transmission side of transceiver 11 includes Reed-Solomon encoder 21 that adds a redundancy bit for parity check, interleave unit 22 that sorts data to enable a burst error correction during a Reed-Solomon decoding, Trellis encoder 23 that performs data convolution from a Trellis encoding, tone ordering unit 24 that lays out a bit number for each carrier, constellation encoder 25 that converts bit streams (configuring transmission data) into topology data on a constellation coordinates (constellation data), and IFFT unit 26 that performs an Inverse Fast Fourier Transform (hereafter referred to as IFFT) on data after the constellation encoding process. IFFT unit 26 includes register 26a where processor 20 writes constellation data, which becomes a signal pattern for a later-described initial signal.

The reception side of transceiver 11 includes FFT unit 27 that performs a Fast Fourier Transform (hereafter referred to as FFT) on sampling data of the received signal, constellation decoder/FEQ unit 28 that decodes reception data from constellation data of the FFT output signal and corrects a topology on the constellation coordinates, tone de-ordering unit 29 that restores data laid out to each carrier after tone ordering process at the transmission side, Viterbi decoder 30 that performs Viterbi decoding on the received data, de-interleave unit 31 that restores data being resorted by the transmission side, and Reed-Solomon decoder 32 that deletes the redundancy bit added by the transmission side. FFY unit 27 includes register 27a that has a capacity at least for the writing in the constellation data of the initial signal. Transceiver 11 is connected to host 12 via host interface (I/F) 36.

Transceiver 11 includes interleave memory 33 that is a work area used by interleave unit 22 and de-interleave unit 31 for data expansion. Interleave memory 33 is provided with downstream area 33a to be used by de-interleave unit 31, and upstream area 33b to be used by interleave unit 22. In this embodiment, processor 20 is able to use interleave memory 33 during the initialization sequence. In particular switch controller 34 controls switch 35 so that de-interleave area 33a of interleave memory 33 is connected to de-interleave unit 31 or processor 20.

Figure 3:
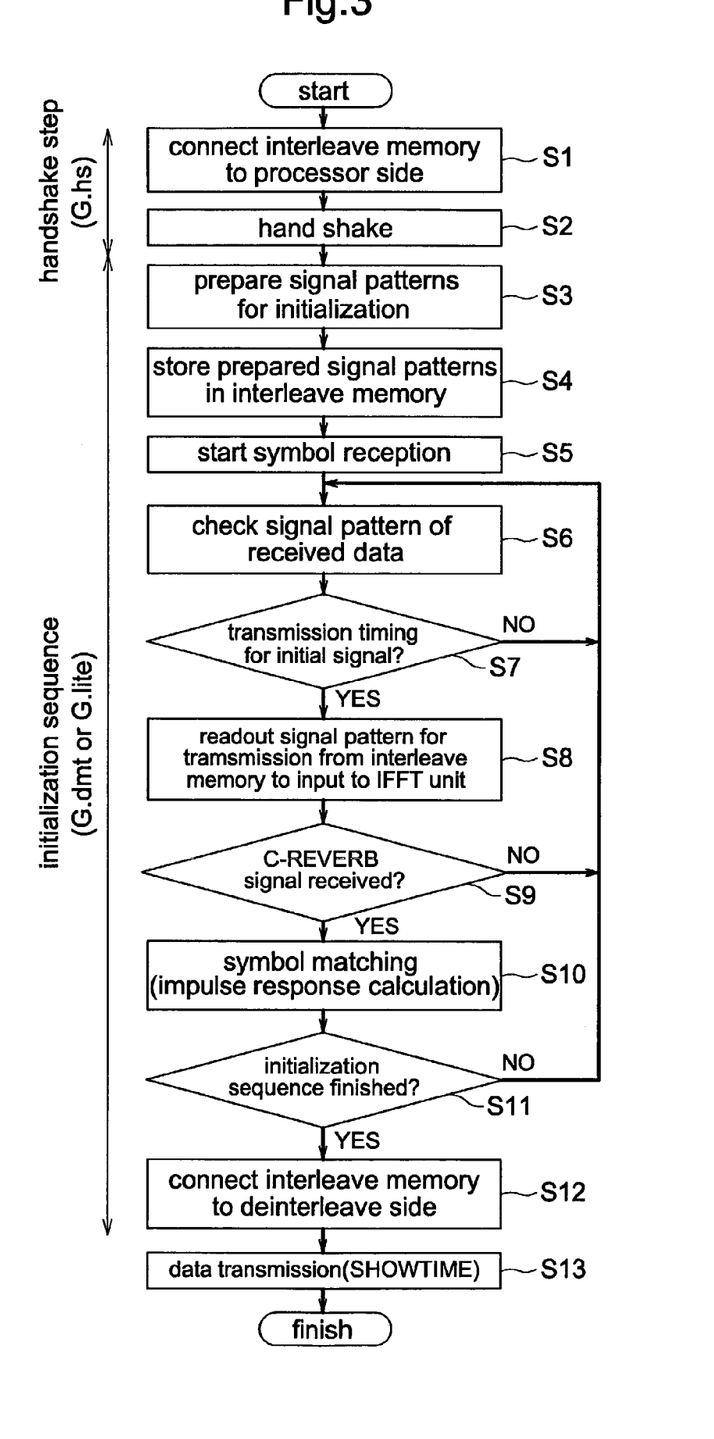
FIG. 3 is a flowchart of the ATU-R transmission system according to the embodiment of the present invention.

FIG. 3 is used to specifically illustrate the operation according to the above configuration of the present embodiment. When ADSL communication apparatus 2 is turned on, switch controller 34 directed by processor 20 controls switch 35 and connects interleave memory 33 with processor 20 (step S1). Then, processor 20 can use downstream area 33a of interleave memory 33 as a work area.

Then, a handshake step according to G.hs recommended by the ITU-T is executed (step S2). During the handshake step, the ATU-C and ATU-R exchange capability information and determine the content of the initialization sequence (G.dmt or G.lite).

When the handshake step is completed, the initialization sequence is started. In the present embodiment, prior to transmission/reception of REVERB signals and the like, a signal pattern (for the REVERB signals and the like) is generated to be used during the initialization sequence (step S3), which is stored within downstream area 33a of interleave memory 33 (step S4). When the above preparation is completed, symbol reception is initiated (step S5).

As illustrated in FIGS. 4 and 5, the ATU-C transmits initial signals such as C-REVERB1, 2, 3, 4, and 5, C-SEGUE1, 2, and 3, and C-MEDLEY. The ATU-R transmits initial signals such as R-REVERB1, 2, 3, 4, 5, and 6, R-SEGUE1, 2, 3, 4, and 5, and R-MEDLEY.

The above initial signals are generated based on their individual calculation formulas to exhibit specific signal patterns set by the recommendation. For example, the signal pattern used for C-REVERB1 must be a pseudo random sequence (PRD) dn (n=1 through 512), which is defined by the recommendation. The signal pattern used for C-SEGUE1 must be demodulation from a transmission point during the topology demodulation so that the topology is inverted 180 degrees every tone, which is regulated to be at every 10 symbols.

In this embodiment, the initial signals transmitted/received during the initialization sequence are calculated by processor 20 prior to starting the symbol reception (beginning of the initialization sequence). The calculation result is stored within downstream area 33a of interleave memory 33 in advance, in the constellation data format (state immediately before being input to IFFT unit 26). Since there are a plurality of carriers used in the upstream (uplink) during the initialization sequence, constellation data is calculated for each carrier, corresponding to the bit string of R-REVERB2.

At the ATU-R, the reception analog signal from the line is sampled by the AD converter of AFE 13, and the sampling data is input to FFT unit 27. FFT unit 27 performs a Fourier conversion on the sampling data equivalent to 1 symbol, as an FFT input, and FFT output for 1 symbol is buffered in register 27a. The buffered FFT output is configured with constellation data for each carrier. For example, C-REVERB transmits 1535 symbols. While register 27a buffers 1 symbol at a time, processor 20 recognizes that C-REVERB is being transmitted when a predetermined number of symbols are received.

In this embodiment, the signal pattern of the FFT output that is buffered in register 27a, and a signal pattern of initial signal of the center side (which is stored in downstream area 33a at step S4) are compared (step S6). When a matching signal pattern is found in the downstream area 33a from the comparison, processor 20 recognizes that the initial signal with the matching signal pattern is received.

Accordingly, the signal pattern of the initial signal to be received from the opposing apparatus is stored in advance in the same state as the FFT output. Then, the signal pattern is compared with the FFT output of the initial signal received from the opposing apparatus, making it possible to specify the initial signal received from the opposing apparatus. Therefore, it is possible to recognize the initial signal by the simple process of matching the signal patterns, thereby lightening the calculation load of processor 20.

In addition, as shown in FIGS. 4 and 5, the transmission timing of an initial signal generated from ATU-C is fixed. Therefore, the ATU-R, for example, can determine the initial signal to be transmitted from the ATU-R and the transmission timing according to the reception of the initial signal recognized by the above comparison.

When processor 20 of the ATU-R determines that it is time to transmit R-REVERB2 (step S7), for example, processor 20 retrieves the signal pattern of R-REVERB2 (constellation data format) from downstream area 33a, and writes the pattern into register 26a of IFFT unit 26 (step S8). In particular, constellation data for each individual carrier is written in the register, the carrier being used for the upstream (uplink) during the initialization sequence according to the bit string of R-REVERB2.

IFFT unit 26 modulates the constellation data written in register 26a, by performing an inverse Fourier transform. The DA converter of AFE 13 converts the modulation signal into an analog signal and transmits the signal to the line.

As described above, when processor 20 inputs the constellation data (e.g., initial signal of R-REVERB) to IFFT unit 26, there is no need to calculate for generating the above-described initial signal. Therefore, it is possible to prepare necessary initial signals for a plurality of carriers within a limited time.

In addition, while the ATU-C maintains the symbol synchronization of the transmission data according to a standard clock given from the exchange apparatus, the ATU-R cannot directly receive the standard clock from the exchange apparatus. Therefore, C-REVERB received from the ATU-C is used to adjust the reception timing for the symbol matching.

When the ATU-R recognizes the initial signal from the matching procedure at step S6, ATU-R determines whether the recognized initial signal is C-REVERB (step S9). Upon receiving C-REVERB, processor 20 secures the work area within downstream area 33a, for calculating the impulse response and for detecting the peak location. Then, by using the C-REVERB FFT output, the impulse response res (t) is calculated as follows (step S10).

$$res\ (t) = invers\ FFT\ (Z(f))$$

When impulse response on the line (res (t)) is calculated, the peak location of the impulse response is detected from the impulse response data opened on the time sequence in the work area, in order to detect the beginning of C-REVERB symbol. By matching the symbol breakpoint timing at the ATU-R with the beginning of the detected symbol, reception timing adjustment is completed.

Additionally, in case of an initialization sequence error during the initialization sequence, the process returns to step S1 to restart the procedure from the memory switch control.

As shown in FIGS. 4 and 5, the ATU-R completes the initialization sequence when R-SEGUE5 is transmitted for 10 symbols (step S11). When switch controller 34 receives an instruction from processor 20, switch controller 34 connects downstream area 33a to de-interleave unit 31 (step S12). Accordingly, de-interleave unit 31 can use downstream area 33a after the data transmission is initiated.

When the above-described initialization sequence is completed, the data transmission (SHOWTIME) is subsequently started (step S13). At the downstream side, de-interleave unit 31 opens the reception data in downstream area 33a, so that the sorted data upon transmission is rearranged to the original order. The rule for data sorting (parameter for depth for interleave, and the like) is exchanged during the above initialization sequence.

When there is a CRC error or Reed-Solomon correction dysfunctional error in the downstream process during the data transmission, the control returns to the process of step S1 to restart the procedure from the memory switch control.

In the above explanation, an ADSL communication apparatus is used as an example. However, the invention can also be applied to other DSL communication, especially for a situation where the transmitting initial signal is already known and the process capability of processor 20 is inadequate to generating initial signal.

Further, although the above illustration uses an interleave memory, another available memory (especially a memory used for data process during SHOWTIME) can be employed.

Furthermore, the above illustration is provided using the ATU-R side. However, the invention can have the same effect when transceiver 11 of FIG. 2 is installed to the ATU-C side.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

This application is based on the Japanese Patent Application No. 2002-160496 filed on May 31, 2002, entire content of which is expressly incorporated by reference herein.

What is claimed is:

1. A DSL modem apparatus comprising:
   an IFFT unit that performs an inverse Fourier transform on transmission data;

an FFT unit that performs a Fourier transform on reception data;

a processor that executes an initialization sequence according to a protocol;

an interleave unit that interleaves transmission data to be input to said IEFT unit after data transmission is initiated;

a de-interleave unit that de-interleaves reception data being output from said FFT unit after data transmission is initiated;

an interleave memory that is used to open data upon interleaving and/or de-interleaving; and a switch controller that enables said processor to maintain said interleave memory at a usable state during the initialization sequence, and said interleave unit and/or said de-interleave unit to maintain said interleave memory at the usable state after the data transmission is initiated.

* * * * *